United States Patent
Oshima

[11] Patent Number: 6,056,982
[45] Date of Patent: May 2, 2000

[54] CONFECTIONERY PATTERN INTAGLIO, PATTERN SHEET, PATTERNED CONFECTIONERY SHEET, CONFECTIONERY, CONFECTIONERY MANUFACTURING METHOD

[75] Inventor: Yasuhiro Oshima, Osaka, Japan

[73] Assignee: Meiwa Gravure Co., Ltd., Osaka, Japan

[21] Appl. No.: 09/034,289

[22] Filed: Mar. 4, 1998

[30] Foreign Application Priority Data

Mar. 7, 1997 [JP] Japan ................................. 9-053635

[51] Int. Cl.$^7$ .............................. A23G 1/00; A01J 27/02
[52] U.S. Cl. .............................. 426/104; 118/13; 118/14; 118/76; 118/212; 426/383
[58] Field of Search ................ 426/104, 87, 383; 118/13, 14, 212, 76

[56] References Cited

U.S. PATENT DOCUMENTS

| | | | |
|---|---|---|---|
| 1,127,406 | 2/1915 | Langhammer | 426/104 |
| 1,788,493 | 1/1931 | Olshewsky et al. | |
| 2,353,594 | 7/1944 | Seagren | 426/104 |
| 2,394,322 | 2/1946 | McKee | 426/104 |
| 3,253,929 | 5/1966 | Peters | 426/104 |
| 3,503,345 | 3/1970 | Abrams | 426/104 |
| 5,667,826 | 9/1997 | Lasater | 426/104 |

FOREIGN PATENT DOCUMENTS

| | | |
|---|---|---|
| 0 168 027 A2 | 1/1986 | European Pat. Off. |
| 0 498 357 A2 | 8/1992 | European Pat. Off. |
| 2 697 973 A1 | 5/1994 | France. |
| 59-120051 | 7/1984 | Japan. |
| 62-247633 | 9/1988 | Japan. |
| 64-16678 | 1/1989 | Japan. |
| 630 210 | 10/1949 | United Kingdom. |
| WO 95/01735 | 1/1995 | WIPO. |
| WO95/01735 | 1/1995 | WIPO. |

OTHER PUBLICATIONS

Patent Abstracts of Japan, vol. 013, No. 193, May 9, 1989 (Abstract of JP Laid–Open 01–016678 A, Jan. 20, 1989 (FC).
Patent Abstracts of Japan, vol. 008, No. 236, Oct. 30, 1984 (Abstract of JP Laid–Open 59–120051 A, Jul. 11, 1984 (FD).

*Primary Examiner*—Nina Bhat
*Attorney, Agent, or Firm*—Kubovcik & Kubovcik

[57] ABSTRACT

Concave portions, in which patterns to be put to a surface of a confectionery are formed, are provided to one surface of a confectionery pattern intaglio, the concave portions are charged with ingredients paste, and the ingredients paste are solidified. As a result, the same pattern can be mass-produced successively. In the case where the intaglio is removed from the ingredients paste, a printed material is bond to the ingredients paste so that a confectionery sheet is manufactured, and in the case where the intaglio is not removed, the print material is or is not bond to the ingredients paste so that a confectionery sheet is manufactured. When a side face of a confectionery main body is covered with this confectionery sheet, for example, confectionery with excellent decoration can be manufactured by simple operation.

10 Claims, 7 Drawing Sheets

CONFECTIONERY PATTERN INTAGLIO, PATTERN SHEET, PATTERNED CONFECTIONERY SHEET, CONFECTIONERY, CONFECTIONERY MANUFACTURING METHOD

BACKGROUND OF THE INVENTION

The present invention relates to a confectionery pattern intaglio, pattern sheet, patterned confectionery sheet, confectionery, confectionery manufacturing method and patterned confectionery sheet manufacturing apparatus which improve designs of confectionery such as cakes and cookies.

In confectionery, decoration of a cake is superior in design because cream and various topping materials are used for decorating a cake beautifully, but compared with the gorgeous top surface, the side surface of a cake lacks design a little. For example, as for a cake whose sponge layer is exposed, there are cakes in which the sponge layer is divided into two so that cream, or cream and fruits are sandwiched therebetween, a cake such that the sponge layers with plural colors are arranged in grid pattern and striped pattern, and a cake in which marble-patterned sponge is used. Moreover, in a case using mousse, its surface is simply patterned with colors. However, in those cases, the design is monotonous. A cake is sometimes decorated by squeezing out cream, but this is limited to a comparatively large-sized cake, and this requires experience and skillful technique. If a small-sized cake is decorated in such a manner, a lot of time and effort are required, thereby causing high costs.

Meanwhile, as for cookies, there are cookies such that nuts are sliced and are mixed with dough to be baked, cookies that plural pieces of dough with plural colors are arranged in a grid pattern and striped pattern to be baked, cookies which are topped with nuts such as almond or various topping materials, cookies which are covered with sugar, and cookies to which the yolk of an egg is applied in order to glaze the cookies. However, in any kinds of the above cookies, it is hard to say that they are superior in colors and design.

Therefore, there develops a technique that colorful patterns are previously printed in a sheet spreading on a baking mold through silkscreen, and dough is put into the baking mold on which the sheet spreads to be baked, and the patterns are transferred onto the side face of sponge as shown in FIG. 1. However, this technique is limited its application only to the baking process using the baking mold, so there arises a problem that it cannot be used for a mousse cake, etc. made by cooling and making it hard and for cut cake.

BRIEF SUMMARY OF THE INVENTION

The present invention is devised in order to solve the above problem, and it is an object of the present invention to provide a confectionery pattern intaglio, pattern sheet, patterned confectionery sheet, confectionery, confectionery manufacturing method and patterned confectionery sheet manufacturing apparatus for manufacturing confectionery having excellent design.

A confectionery pattern intaglio of the present invention which is made of metal or synthetic resin and has a substantially cylindrical shape, is characterized by having an outer circumferential surface provided with concave portions in which patterns to be put on a surface of a confectionery are formed.

Therefore, this intaglio is charged with ingredients paste to be patterns (for example, geometrical patterns, characters, etc.) and the ingredients paste is solidified. When the intaglio is rotated, the same patterns can be formed successively.

A sheet-type confectionery pattern intaglio of the present invention made of a synthetic resin, paper or metallic foil, is characterized by having one surface provided with concave portions in which patterns to be put on a surface of a confectionery are formed.

Therefore, this intaglio is charged with ingredients paste to be patterns (for example, geometrical patterns, characters, etc.), and the ingredients paste is solidified. Since this intaglio is a sheet-type one, after and before charged with the ingredients paste, it can be cut to be used.

A patterned confectionery sheet of the present invention is characterized by having: a sponge material; and ingredients with colors different from that of the sponge material which are stuck to the sponge material in a convex form to form geometrical patterns or characters.

Therefore, this patterned confectionery sheet is cut into a predetermined size, and it is wound around a side surface of confectionery as one part of confectionery, for example so that the confectionery can be decorated easily. Here, a non-ingredients sheet which was stuck in the manufacturing process or for transportation may be included.

A patterned confectionery sheet is characterized by having: ingredients paste charged in concave portions in which patterns to be put on a surface of a confectionery are formed and which are provided on an outer circumferential surface of an intaglio made of metal or synthetic resin which is substantially cylindrical; and a print material on which the ingredients paste is to be printed.

Therefore, patterns are formed on a surface of the print material by the ingredients paste with predetermined color in a convex form. The print material is cut into a predetermined size, and a side face of confectionery, for example, is decorated with it as a part of the confectionery.

A pattern sheet is characterized by having: a sheet-type intaglio made of synthetic resin, paper or metallic foil having one surface provided with concave portions in which patterns to be put on a surface of a confectionery are formed; and ingredients paste with predetermined color charged in the concave portions.

Therefore, this pattern sheet can be used in various methods such that it is cut and is stuck to a print material (for example, baked cookie) and patterns of the ingredients paste are printed on the cookie, the sheet is cut to be spread over a baking mold and sponge dough (print material) is put thereinto to be baked and patterns are printed, the sheet is not cut and sponge dough (print material) is put on the sheet to be baked and the sheet is cut.

The patterned sheet of the present invention is characterized by further having a print material which is stuck to the one surface provided with the concave portions.

Therefore, this patterned sheet can be used in various methods such that the sheet is formed in a predetermined shape and only the confectionery pattern intaglio is removed so that confectionery is manufactured, and after the confectionery pattern intaglio is removed, the sheet is formed in a predetermined shape so that confectionery is manufactured. Moreover, the upper part of the print material is covered with an reinforcing sheet and it may be transported to a place where confectionery is manufactured.

Confectionery of the present invention is characterized by having: a confectionery main body; and a confectionery sheet which covers a side face of the confectionery main body, and the confectionery sheet includes: sponge material;

and ingredients with different color from that of the sponge material, and the ingredients are stuck to the sponge material in a convex form to form geometrical patterns or characters.

In addition, confectionery of the present invention is characterized by having: a confectionery main body; and a confectionery sheet which covers a side face of the confectionery main body, and the confectionery sheet includes: ingredients paste charged in concave portions in which patterns to be put on a surface of a confectionery are formed and which are provided on an outer circumferential surface of an intaglio made of metal or synthetic resin which is substantially cylindrical; and a print material in which the ingredients paste is to be printed.

Therefore, colorful patterns have been already formed on the patterned confectionery sheet, and the side face of the confectionery is decorated uniformly. Moreover, since a special technique and skilled artisan are not required and confectionery can be mass-produced successively, manufacturing time and cost can be reduced greatly.

Confectionery of the present invention is characterized by having: a confectionery main body; and a confectionery sheet which covers a side face of the confectionery main body, and the confectionery sheet includes: ingredients paste charged in concave portions in which patterns to be put on the surface of confectionery are formed and which are provided on one surface of a sheet-type intaglio made of synthetic resin, paper or metallic foil; and a print material in which the ingredients paste is to be printed.

Therefore, since patterns are formed by the intaglio technique, the side face of confectionery can be decorated uniformly without requiring a special technique and skilled artisan. The patterns on the side face can be obtained by winding the patterned confectionery sheet around the confectionery main body and peeling the confectionery pattern intaglio therefrom.

Confectionery of the present invention is characterized by having: a confectionery main body; and ingredients paste printed in a side face of the confectionery main body, and the ingredients paste charged in concave portions in which patterns to be put on a surface of a confectionery are formed and which are provided on one surface of a sheet-type intaglio made of synthetic resin, paper or metallic foil.

Therefore, the patterns by the ingredients paste with predetermined color are formed on the surface of the print material in a convex form. Since these patterns can be formed easily only by sticking the sheet-type intaglio, a special technique and skilled artisan are not required.

A confectionery manufacturing method of the present invention is characterized by including the steps of: charging ingredients paste with predetermined color in the concave portions of the confectionery pattern intaglio; sticking a print material to an outer circumferential surface charged with the ingredients paste; bonding the printed material to the ingredients paste; and after bonding, removing the confectionery pattern intaglio to obtain a patterned confectionery sheet.

In addition, a confectionery manufacturing method of the present invention is characterized by including the steps of: charging ingredients paste with predetermined color in the concave portions of the confectionery pattern intaglio; sticking a print material to an outer circumferential surface charged with the ingredients paste; bonding the printed material to the ingredients paste to obtain a patterned confectionery sheet; and after bonding, removing the confectionery pattern intaglio.

Therefore, since patterns are formed by the intaglio technique, confectionery can be decorated uniformly without requiring a special technique and skilled artisan. Moreover, since confectionery can be mass-produced successively, manufacturing time and cost can be reduced greatly.

The confectionery manufacturing method of the present invention is characterized by further including the step of after removing the confectionery pattern intaglio, covering a side face of predetermined confectionery with the patterned confectionery sheet.

In addition, the confectionery manufacturing method of the present invention further includes the step of covering a side face of predetermined confectionery with the patterned confectionery sheet.

Therefore, the side surface of confectionery which did not have excellent design conventionally can be decorated easily and uniformly.

A patterned confectionery sheet manufacturing apparatus of the present invention, is characterized by including: a confectionery pattern intaglio made of metal or synthetic resin having a substantially cylindrical shape, an outer circumferential surface of the confectionery pattern intaglio provided with concave portions in which patterns to be put to a surface of confectionery are formed; charging section for charging the concave portions of the confectionery pattern intaglio with ingredients paste; bonding section for sticking a print material to the surface of the confectionery pattern intaglio charged with the ingredients paste to bond the print material to the ingredients paste; and peeling section for peeling the print material to which the ingredients paste was stuck from the confectionery pattern intaglio.

Therefore, the patterned confectionery sheets can be mass-produced successively.

The confectionery sheet manufacturing apparatus of the present invention, is characterized by further including cutting section for cutting the patterned confectionery sheet separated from the confectionery pattern intaglio into a predetermined length.

Therefore, the shift to the steps thereafter such as the step of covering the side face of confectionery with the patterned confectionery sheet can be carried out smoothly.

A patterned confectionery sheet manufacturing apparatus of the present invention is characterized by including: a sheet-type confectionery pattern intaglio made of a synthetic resin, paper or metallic foil, one surface of the confectionery pattern intaglio being provided with concave portions formed in which patterns to be put onto a surface of confectionery are formed; charging section for charging the concave portions of the confectionery pattern intaglio with ingredients paste; and bonding section for sticking a printed material to a surface of the confectionery pattern intaglio charged with the ingredients paste to bond the printed material to the ingredients paste.

Therefore, the patterned confectionery sheets can be mass-produced successively.

The above and further objects and features of the invention will more fully be apparent from the following detailed description with accompanying drawings.

DETAILED DESCRIPTION OF THE INVENTION

The following describes embodiments of the present invention concretely on reference with the drawings.

Figure 1:
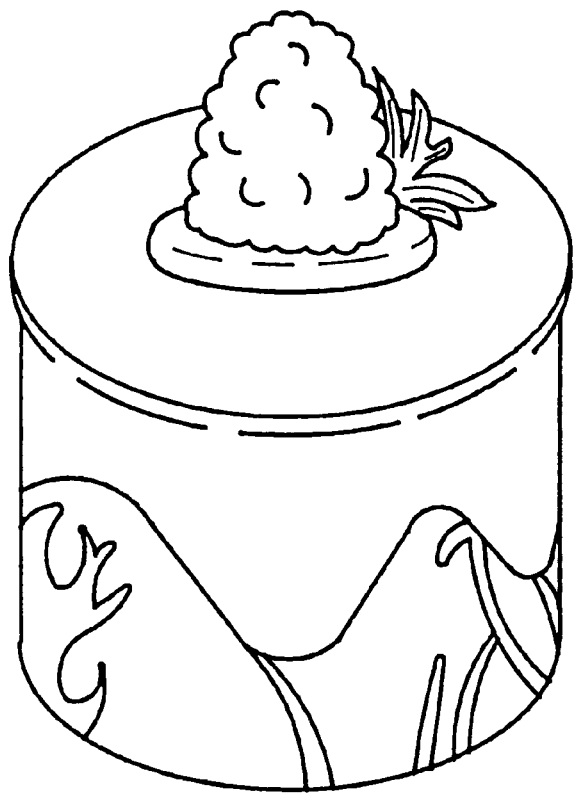
FIG. 1 is a perspective view showing confectionery obtained by transferring patterns onto the side surface of sponge by a conventional technique.
Figure 2:
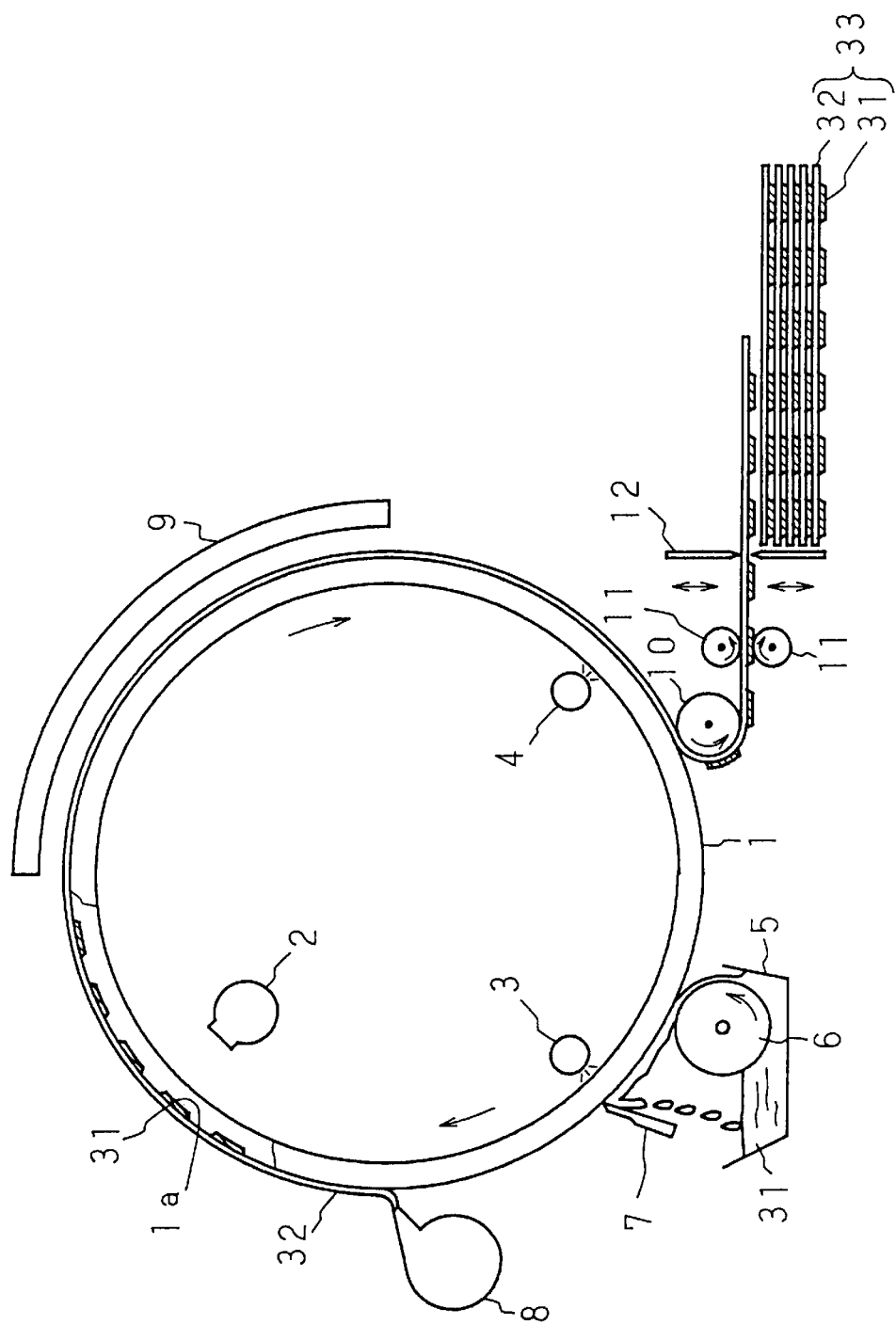
FIG. 2 is a drawing showing a patterned confectionery sheet manufacturing apparatus of the present invention which is broken partially.

FIG. 2 is a drawing showing the patterned confectionery sheet manufacturing apparatus of the present invention which is partially sectioned. In the drawing, 1 is a cylinder made of metal such as copper, brass and fluorinated iron (or synthetic resin belt made of silicone, plastic or the like having heat resistance), and it is rotated in the direction of an arrow. Desired patterns are formed on the outer surface of the cylinder 1 by concave portions 1a, and a heater 2 and cooling units 3 and 4 are located inside the cylinder 1 in predetermined intervals.

The cooling unit 3 sprays cooling water to an inner circumference of the cylinder 1, and on an outer circumferential surface which faces the cooling unit 3, an adhesion roll 6 whose substantially semicircular portion is soaked into ingredients paste 31 in an ingredients paste container 5 is located adjacently. A scraping-off unit 7 for scraping off the ingredients paste 31 adhering to the cylinder 1 excessively is provided to a lower stream side of the adhesion roll 6 in the cylinder rotating direction, and an application unit 8 for applying sponge dough 32 to the surface of the cylinder 1 is mounted to the lower stream side. The heater 2 is located to a lower stream side of the application unit 8, and a heater 9 is provided on the outer circumference on a lower stream side of the heater 2 over ¼ circumference of the cylinder 1. The cooling unit 4 is located on a lower stream side of the heater 9, and a removing roll 10 is located on a lower stream side of the cooling unit 4, and sheet lead-on rolls 11 and a cutter 12 are provided to suitable positions.

In this patterned confectionery sheet manufacturing apparatus, predetermined ingredients paste 31 is charged in the ingredients paste container 5, and then the adhesion roll 6 is rotated. Moreover, predetermined sponge dough 32 is charged in the application unit 8. Then, the heaters 2 and 9 and cooling units 3 and 4 are actuated, and the cylinder 1 is rotated at a predetermined speed. As a result, first the ingredients paste 31 adheres to the concave portions 1a provided to the cylinder 1 and to the surface of the cylinder 1 by the rotation of the adhesion roll 6.

After excessive ingredients paste 31 is scraped off by the scraping-off unit 7, the sponge dough 32 is applied by the application unit 8 thereto, and the ingredients paste 31 and sponge dough 32 are heated by the heaters 2 and 9 so that the ingredients paste 31 sticks to the sponge dough 32. Thereafter, the ingredients paste 31 is easily separated from the concave portions 1a by cooling via the cooling unit 4, and a patterned confectionery sheet 33 is pulled via a removing roll 10 to be removed from the cylinder 1. The patterned confectionery sheet 33 is led by sheet lead-on rolls 11, and it is cut by a cutter 12 into predetermined width and length. Moreover, after the sponge dough 32 is heated, a cooking sheet or synthetic resin sheet as a reinforcing material may be stuck to the sponge dough 32 as the need arises.

The patterned confectionery sheet 33 obtained in such a manner is such that cubic patterns of desired colors and shapes are formed on the surface of the sponge. The sheets with a desired size can be manufactured successively by adjusting positions and timing of cutting by the cutter 12.

If the patterns formed on the cylinder 1, materials and colors of the ingredients paste 31 charged in the ingredients paste container 5 and materials and colors of the sponge dough charged in the application unit 8 are changed, the confectionery sheets 33 with various patterns can be manufactured.

Figure 3:
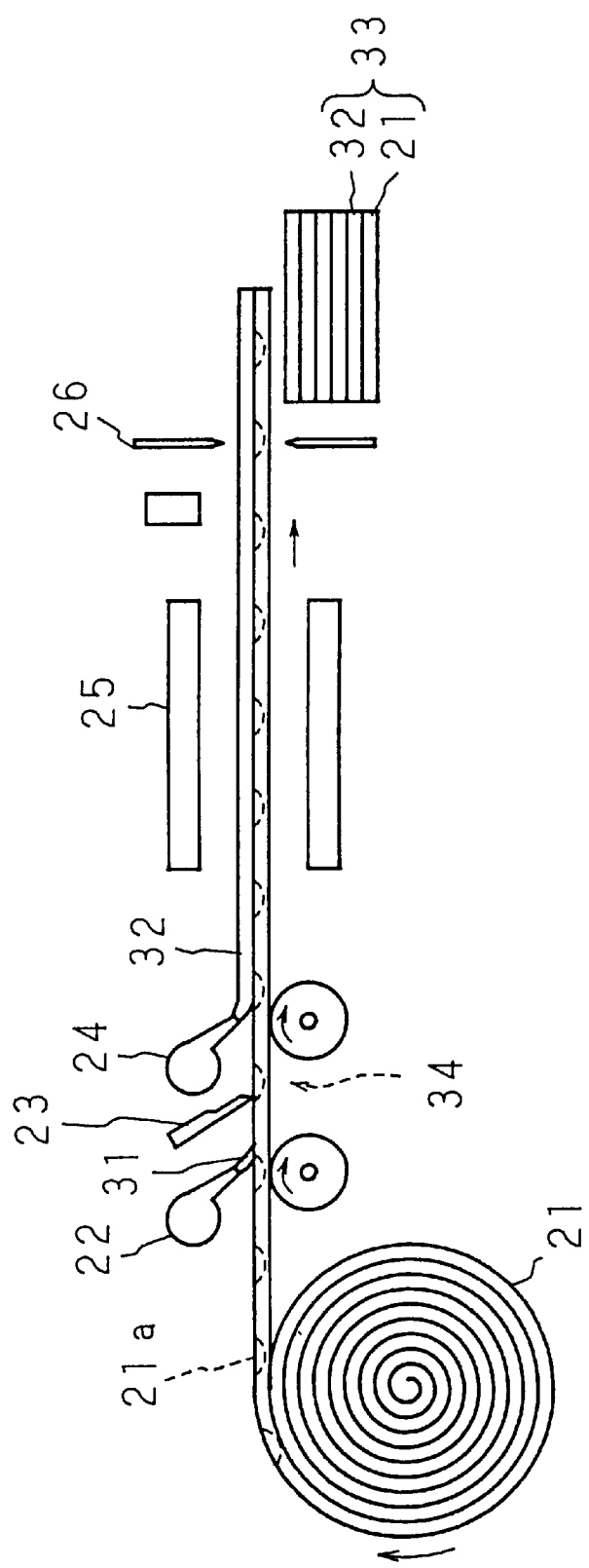
FIG. 3 is a drawing showing another example of the patterned confectionery sheet manufacturing apparatus of the present invention.

FIG. 3 is a drawing showing another example of the patterned confectionery sheet manufacturing apparatus of the present invention. In the drawing, 21 is an intaglio sheet (oven sheet) made of a synthetic resin with heat resistance such as a silicone resin and plastic, paper, aluminum foil or the like, and it is wound up in a roll shape to be capable of pulling it out. Desired patterns are formed on one surface (upper surface in FIG. 3) of the intaglio sheet 21 by a heat-embossing process (or wet-embossing process) through the concave portion 21a, and a charging unit 22, scraping-off unit 23, application unit 24 and heater 25 are located above the pulled-out intaglio sheet 21 in this order in predetermined intervals. Further, a cutter 26 for cutting the intaglio sheet 21 is located.

In this patterned confectionery sheet manufacturing apparatus, predetermined ingredients paste 31 is charged in the charging unit 22, and predetermined sponge dough 32 is charged in the application unit 24. Then, the heater 25 is operated to pull out the intaglio sheet 21 at a predetermined speed. As a result, the ingredients paste 31 first adheres to the concave portions 21a provided onto the intaglio sheet 21 and to the surface of the intaglio sheet 21 by the charging unit 22.

After the ingredients paste 31 excessively adhering is scraped off by the scraping-off unit 23, the sponge dough 32 is applied by the application unit 24, and the ingredients paste 31 and sponge dough 32 are heated by the heater 25 so that the ingredients paste 31 sticks to the sponge dough 32. The patterned confectionery sheet 33 with a desired size to which the intaglio sheet 21 adheres can be obtained by cutting the intaglio sheet 21 into predetermined width and length through the cutter 26.

The patterned confectionery sheet 33 obtained in such a manner is constituted such that cubic patterns with desired colors and shapes are put to the surface of the sponge. When the cutting position and timing by the cutter 26 are adjusted, the sheets with desired size can be successively manufactured.

If the patterns formed on the intaglio sheet 21, materials and colors of the ingredients paste 31 charged in the charging unit 22, and materials and colors of the sponge dough 32 charged in the application unit 24 are changed, the variously patterned confectionery sheets 33 can be manufactured.

Here, when the sponge dough 32 charged in the application unit 24 is changed into cookie dough, cookies in which patterns are put to their surfaces can be manufactured.

In addition, in the state that the application unit 24 is not provided or nothing is charged in the application unit 24 and the ingredients paste 31 is charged in the charging unit 22, a patterned sheet 34 in which the intaglio sheet 21 was cut is previously manufactured, and the patterned sheet 34 may be used to be stuck to the surface of baked cookies or cake in order to improve the design of the cookies or the cake.

[Embodiment 1]

The apparatus shown in FIG. 2 is used. Characters "HAPPY" which are turned over are formed on an outer circumferential surface of the cylinder 1 with a width of 50 cm by the concave portions 1a in intervals of 19 cm. The ingredients paste 31 colored pink composed of egg, sugar, milk, weak flour, vanilla extract and food red is charged in the ingredients paste container 5. Moreover, the sponge dough composed of egg, sugar, milk, weak flour, butter and vanilla extract is charged in the application unit 8.

When this apparatus is actuated, the pink ingredients paste 31 adheres to the concave portions 1a of the cylinder 1 by the adhesion roll 6, and the ingredients paste 31 which adhered to places other than the concave portions 1a is scraped off by the scraping-off unit 7. The sponge dough is applied by the application unit 8 which was adjusted so that the application thickness of the sponge dough becomes about 5 mm, and the sponge dough is heated by the heaters 2 and 9 at 170° C. for 5 to 7 minutes. As a result the sponge is baked, and the ingredients paste 31 adheres to its one face. When the sponge is cooled by the cooling unit 4, the sponge to which the ingredients paste 31 adhered is removed easily from the cylinder 1, so it is led to the sheet lead-on rolls 11 through the removing roll 10. When the cutting position and timing by the cutter 12 are adjusted, a confectionery sheet with patterns of 5 cm×19 cm, for example, can be obtained.

Figure 4:
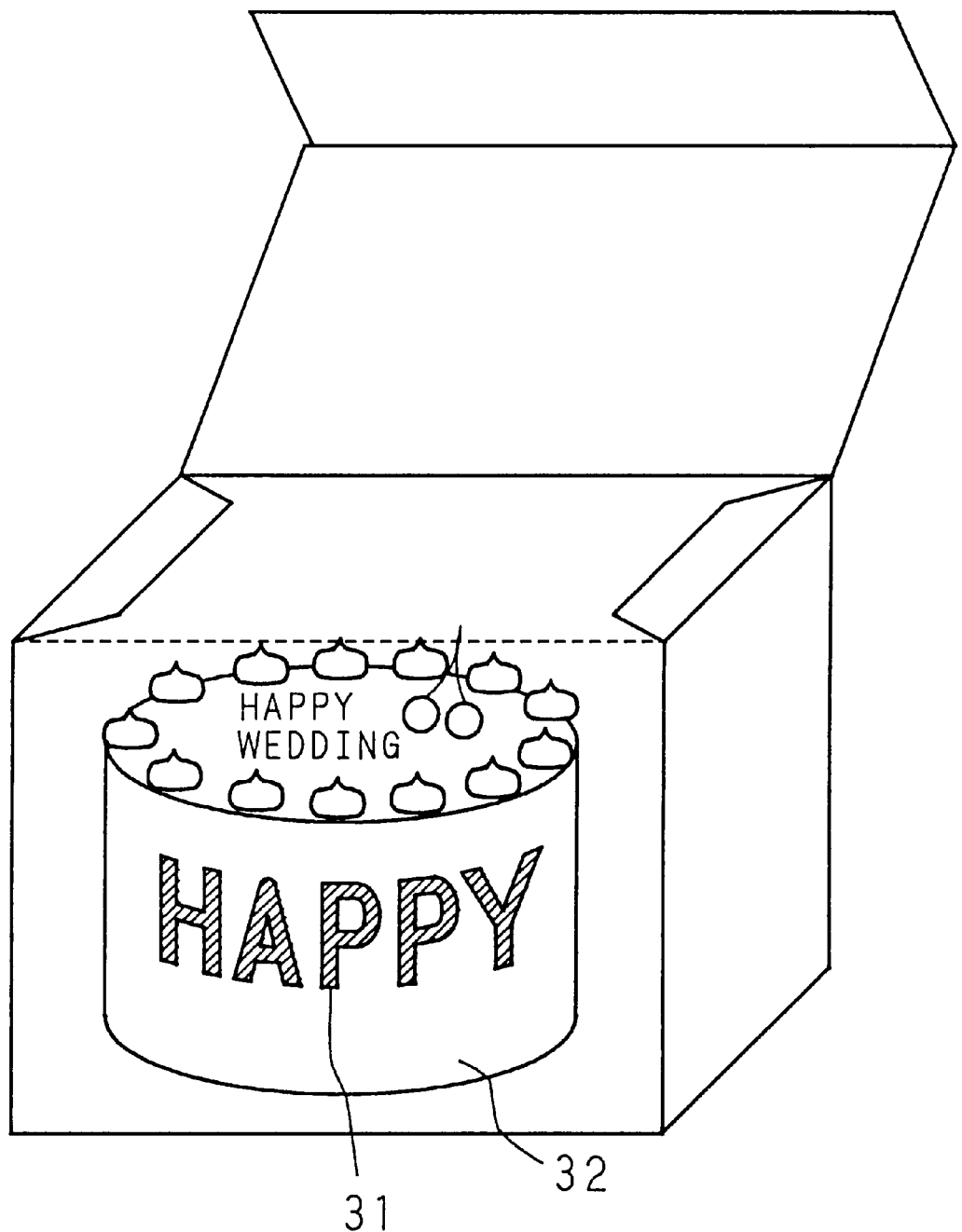
FIG. 4 is a perspective view showing a cake obtained in embodiment 1.

The end portions of this patterned confectionery sheet were joined together in a cylindrical form with its surface where the character "HAPPY" was formed in a convex form by the ingredients paste 31 facing outward, and the sponge which was manufactured separately is charged into the sheet in a cylindrical form and the sponge was topped with strawberry and cream. As a result, besides the topping on the upper surface, the character "HAPPY" rose to the side surface, so a cake with excellent design in which the color of the character matched the colors of the topping materials was obtained (FIG. 4).

[Embodiment 2]

The apparatus shown in FIG. 3 is used. Hexagonal patterns are formed on the intaglio sheet 21 with a width of 50 cm by means of the concave portions 21a. The ingredients paste 31 composed of egg, sugar, milk, weak flour, vanilla extract and cocoa is charged in the charging unit 22. Sponge dough composed of egg, sugar, milk, weak flour, butter and vanilla extract is charged in the application unit 24.

Figure 5:
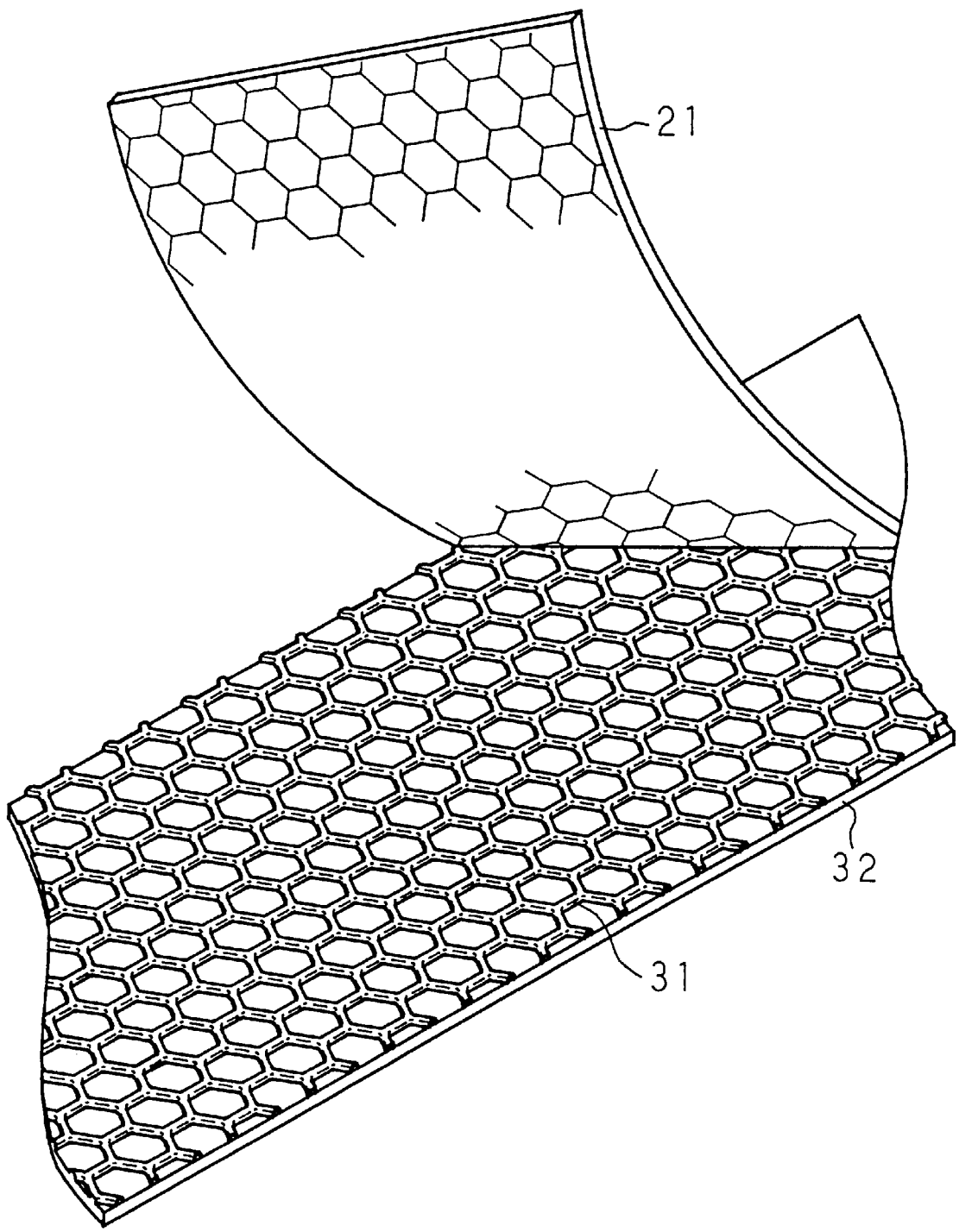
FIG. 5 is a perspective view showing a patterned confectionery sheet used in embodiment 2.

When the apparatus is actuated, the light-brown ingredients paste 31 adheres to the concave portions 21a of the intaglio sheet 21 by the charging unit 22, and the ingredients paste 31 which adhered to places other than the concave portions 21a is scraped off by the scraping-off unit 23. The sponge dough is applied by the application unit 24 which was adjusted so that the application thickness of the sponge dough becomes about 3 mm, and it was heated by the heater 25 at 170° C. for 5 to 10 minutes. As a result, the sponge was baked, and the ingredients paste 31 adheres to the one face of the sponge. When the cutting position and timing by the cutter 26 are adjusted, the hexagonal patterned confectionery sheet 33 of 4 cm×16 cm, for example, can be obtained with the intaglio sheet 21 adhering to it. The intaglio sheet 21 can be easily peeled from the sponge to which the ingredients paste 31 adhered by a hand (FIG. 5).

The end portions of the patterned confectionery sheet 33 from which the intaglio sheet 21 was peeled were joined together in a cylindrical form with the surface on which the hexagonal patterns were formed in a convex form by the ingredients paste 31 facing outward, and cream was charged into the sheet in a cylindrical form, and it was topped with chocolate, cherries and cream. As a result, besides the topping on the upper surface, the continuous hexagonal patterns rose to the side face in a convex form, so a cake with excellent design could be obtained.

[Embodiment 3]

The apparatus shown in FIG. 3 is used. Scantly checked pattern is formed on the intaglio sheet 21 made of polyester with width of 50 cm and thickness of 125 μm by the concave portions 21a. Pudding dough as the ingredients paste 31 composed of egg, sugar, milk and vanilla extract is charged in the charging unit 22. Nothing is charged in the application unit 24.

When this apparatus is actuated, the pudding dough adheres to the concave portions 21a of the intaglio sheet 21 by the charging unit 22, the pudding dough which adhered to places other than the concave portions 21a is scraped off by the scraping-off unit 23. When the pudding dough is heated by the heater 25 at 150° C. for 5 to 10 minutes, the pudding dough is solidified. When the cutting position and timing by the cutter 26 are adjusted, the check-patterned sheet 34 of 5 cm×19 cm, for example, in which the pudding dough was charged in the intaglio sheet 21 can be obtained.

Figure 6:
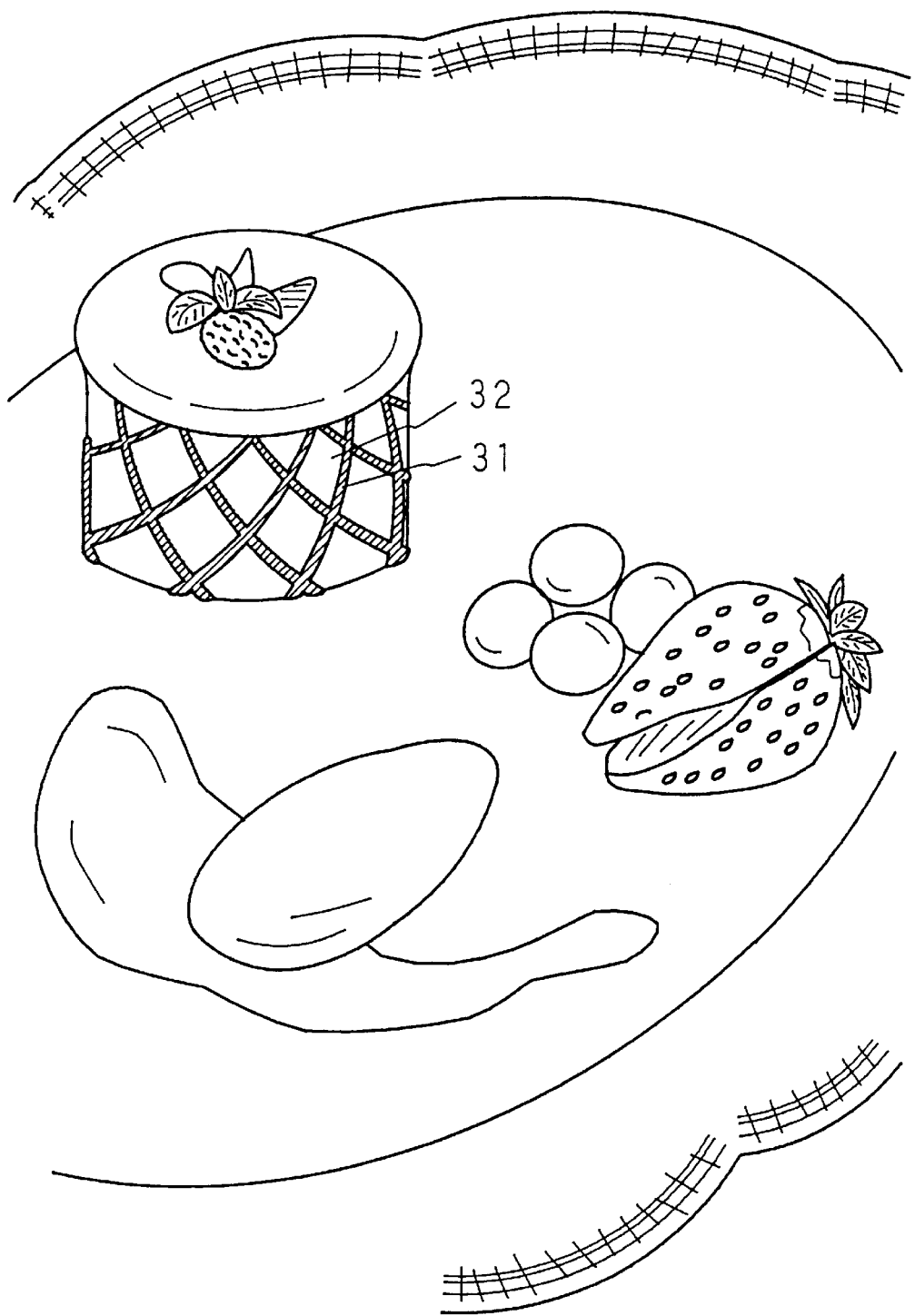
FIG. 6 is a perspective view showing a cake obtained in embodiment 3.

The pattern sheet 34 is spread over a cylindrical baking mold made of aluminum with its surface in which the check-patterned ingredients paste 31 was charged facing inward, and sponge dough composed of egg, granulated sugar, weak flour, cocoa and salad oil is charged in the sheet, and the sponge dough is baked by an oven at 170° C. for 35 minutes. After the sponge is removed from the mold and the intaglio sheet 21 is peeled from the sponge, the sponge is topped with chocolate cream, fruits, etc. As a result, besides the topping on the upper surface, a chocolate cake with excellent design in where the mesh pattern by the pudding rose to its side face in a convex form can be obtained (FIG. 6).

[Embodiment 4]

The apparatus shown in FIG. 3 is used. A scantly checked pattern is formed on the intaglio sheet 21 made of polyester with width of 50 cm and thickness of 50 μm by the concave portions 21a. Pudding dough as the ingredients paste 31 composed of egg, sugar, milk and vanilla extract is charged in the charging unit 22. Nothing is charged in the application unit 24.

Figure 7A:
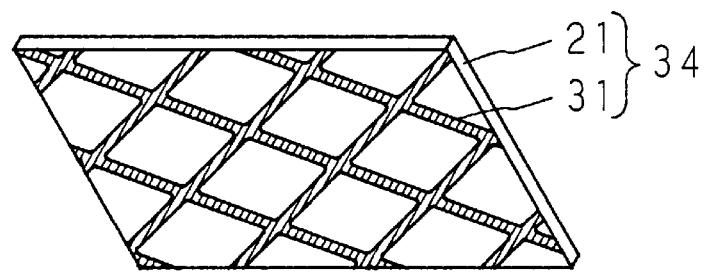
FIGS. 7A, 7B and 7C are drawings showing a printing process in embodiment 4.

When this apparatus is actuated, the pudding dough adheres to the concave portions 21a of the intaglio sheet 21 by the charging unit 22, and the pudding dough which adhered to places other than the concave portions 21a is scraped off by the scraping-off unit 23. When the pudding dough is heated by the heater 25 at 150° C. for 5 to 10 minutes, it is solidified. When the cutting position and timing by the cutter 26 are adjusted, the check-patterned sheet 34 of 7 cm×7 cm, for example with the pudding dough being charged in the intaglio sheet 21 can be obtained (FIG. 7A).

Figure 7B:
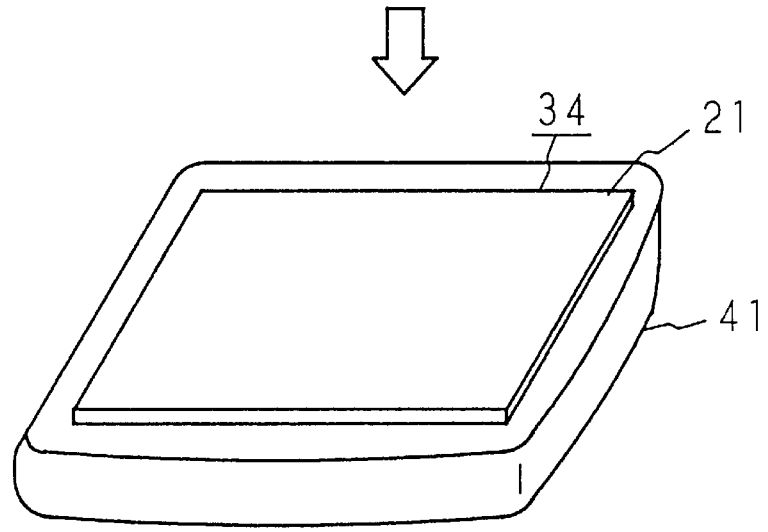
Figure 7C:
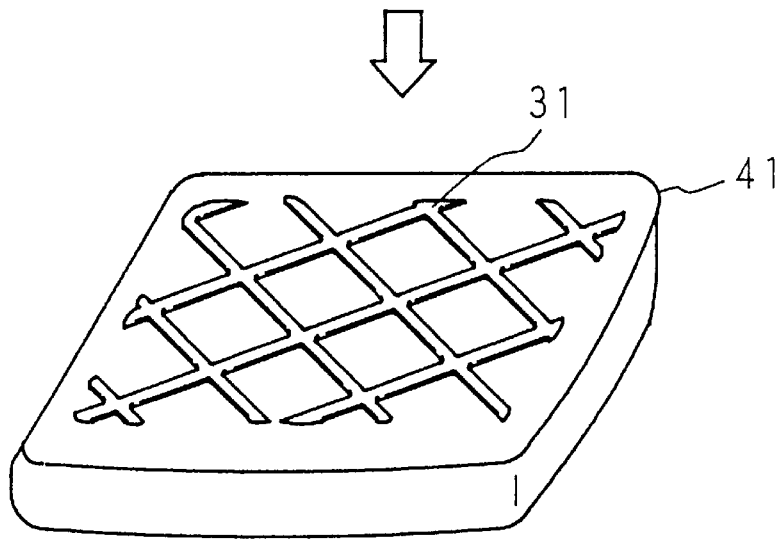

Egg as an adhesive is applied to the patterned surface of the patterned sheet 34 so that the patterned sheet 34 is stuck to the upper surface of a baked cookie 41 (FIG. 7B). After cooling, the intaglio sheet 21 is peeled from the cookie 41, the cookie 41 with excellent design where the mesh-patterned pudding (ingredients paste 31) is printed on its upper surface could be obtained (FIG. 7C).

The aforementioned embodiments describe the application to a cake and cookie, but the present invention may be applied to another confectionery. Moreover, the present invention may be applied also to cuisine such as French cuisine which attaches great importance to decoration.

As mentioned above, in the patterned confectionery sheet of the present invention, geometrical patterns or characters are formed successively, so only by performing simple operations such that the sheet is cut into predetermined size and shape, and the sheet is wrapped around the side face or is put on the upper surface of confectionery, the decoration of the confectionery can be improved easily, and the operation of the decoration which has been performed by a hand conventionally can be performed half-mechanically. According to the present invention to which the intaglio printing technique is applied, the patterned confectionery sheets can be mass-produced successively, and as a result, the present invention produces excellent effects such that the manufacturing costs of confectionery obtained by using the sheets are reduced.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

I claim:

1. A patterned confectionery sheet, comprising:

a sponge material; and ingredients with colors different from that of said sponge material which are stuck to said sponge material in a convex form to form geometrical patterns of characters, said patterned confectionery sheet having a thickness suitable for covering a side face of a confectionery.

2. A patterned confectionery sheet prepared by a process comprising:

charging ingredients paste in concave portions in which patterns to be put on a surface of a confectionery are formed and which are provided on a surface of an intaglio;

forming a sponge material on said surface of said intaglio to cause said patterns of ingredients paste to adhere to said sponge material; and separating said sponge material and patterns of ingredients paste from said intaglio to form said patterned confectionery sheet.

3. A confectionery, comprising:

a confectionery main body; and a confectionery sheet covering a side face of said confectionery main body, wherein said confectionery sheet is manufactured separately from said confectionery main body and includes:

a sponge material; and ingredients with different color from that of said sponge material, said ingredients being stuck to said sponge materials in convex form to form geometrical patterns or characters.

4. A confectionery, comprising:

a confectionery main body; and a confectionery sheet covering a side face of said confectionery main body, wherein said confectionery sheet is produced by a process comprising:

charging ingredients paste in concave portions in which patterns to be put on a surface of a confectionery are formed and which are provided on a surface of an intaglio;

forming a sponge material on said surface of said intaglio to cause said patterns of ingredients paste to adhere to said sponge material; and separating said sponge material and patterns of ingredients paste from said intaglio to form patterned confectionery sheet.

5. A confectionery according to claim 4, wherein the said intaglio is a sheet-type intaglio.

6. A confectionery, comprising:

a confectionery main body; and a pattern formed from ingredients paste and printed on a face of said confectionery main body by a process comprising:

charging said ingredients paste in concave portions in which patterns to be put on a surface of a confectionery are formed and which are provided on a surface of a sheet-type intaglio;

solidifying said ingredients paste in said intaglio;

applying said intaglio to said face of said confectionery main body such that a pattern of solidified ingredients paste adheres thereto; and removing said intaglio.

7. A patterned confectionery sheet, comprising:

a sponge material; and ingredients with colors different from that of said sponge material which are stuck to said sponge material in a convex form to form geometrical patterns of characters, said confectionery sheet being capable of being wound around a side face of a confectionery.

8. A patterned confectionery sheet prepared by a process comprising:

charging ingredients paste in concave portions in which patterns to be put on a surface of a confectionery are formed and which are provided on a surface of an intaglio;

forming a sponge material on said surface of said intaglio and heating said sponge material to cause said patterns of ingredients paste to adhere to said sponge material; and separating said sponge material and patterns of ingredients paste from said intaglio to form said patterned confectionery sheet.

9. A confectionery, comprising:

a confectionery main body; and as a separate layer covering a side face of said confectionery main body, a confectionery sheet;

wherein said confectionery sheet is manufactured separately from said confectionery main body and includes:

a sponge material; and ingredients with different color from that of said sponge material, said ingredients being stuck to said sponge materials in convex form to form geometrical patterns or characters.

10. A confectionery, comprising:

a confectionery main body; and a confectionery sheet covering a side face of said confectionery main body, wherein said confectionery sheet is produced by a process comprising:

charging ingredients paste in concave portions in which patterns to be put on a surface of a confectionery are formed and which are provided on a surface of an intaglio;

forming a sponge material on said surface of said intaglio and heating said sponge material to cause said patterns of ingredients paste to adhere to said sponge material; and separating said sponge material and patterns of ingredients paste from said intaglio to form patterned confectionery sheet.

* * * * *